May 21, 1968 — Z. TAKATS — 3,383,998

RAPID PROCESSING FILM CASSETTE

Filed Aug. 31, 1965 — 4 Sheets-Sheet 1

INVENTOR.
ZOLTAN TAKATS
BY Robert B. Harmon
ATTORNEY

May 21, 1968    Z. TAKATS    3,383,998
RAPID PROCESSING FILM CASSETTE

Filed Aug. 31, 1965    4 Sheets-Sheet 2

INVENTOR.
ZOLTAN TAKATS
BY Robert B. Harmon
ATTORNEY

May 21, 1968     Z. TAKATS     3,383,998
RAPID PROCESSING FILM CASSETTE

Filed Aug. 31, 1965     4 Sheets-Sheet 3

INVENTOR.
ZOLTAN TAKATS

BY *Robert B. Harmon*

ATTORNEY

May 21, 1968     Z. TAKATS     3,383,998
RAPID PROCESSING FILM CASSETTE

Filed Aug. 31, 1965     4 Sheets-Sheet 4

INVENTOR
ZOLTAN TAKATS

BY *Robert B. Harmon*

ATTORNEY 3,383,998
RAPID PROCESSING FILM CASSETTE
Zoltan Takats, Willow Point, Vestal, N.Y., assignor to HRB-Singer, Incorporated, State College, Pa., a corporation of Delaware
Filed Aug. 31, 1965, Ser. No. 483,987
16 Claims. (Cl. 95—90.5)

ABSTRACT OF THE DISCLOSURE

A developing system having a cassette for takeup of photographic film that has just been exposed. The cassette has an interior chamber substantially filled with monobath processing solution and containing a takeup reel which is submerged in the processing solution. Provision is made for accommodation of displaced solution, as the film is wound onto the takeup reel, in such manner that processed film is almost immediately ready for quick removal and use in projection equipment. An intermittent film advance device provides agitation to assure desired action of the processing solution on the exposed film.

---

This invention relates generally to rapid film processing and is specifically directed to a method and apparatus for simultaneously taking up and processing the exposed film.

In the acquisition of imagery by means of aerial cameras, and light output obtained by cathode ray tube oscilloscopic output coming from other sensing systems such as radar, infrared, and/or visible light emitting devices, it is customary to record the imagery on photographic film, and upon completion of the assignment or mission to process the exposed film in photographic laboratories by conventional or fast processing techniques and means. Modern military tactics are dictating rapid advanced development processes in reconnaissance and surveillance sensing systems capable of recording imagery on varied sizes of photographic films at extremely fast rates. It is becoming vitally important that such information be made available during the mission or immediately upon completion of an assignment or mission without the necessity of the exposed film being processed in ground installations after the landing of the aircraft.

The primary object, therefore, of this invetnion is to provide a combination film takeup and processing cassette in which the exposed film is simultaneously processed as it is being wound onto a controlled takeup reel housed within the cassette.

A specific object of this invention is to provide a combination film takeup and processing cassette wherein the cassette includes a controlled takeup reel carried within a chamber substantially filled with a viscous processing solution so that film wound onto the reel during operation of the camera is simultaneously processed.

Another object of this invention is to provide a combination film takeup and processing cassette wherein the cassette includes a takeup reel within a chamber substantially filled with a viscous processing solution so that film wound onto the reel during operation of the camera is simultaneously processed, the reel being so controlled as to cause intermittent advance of the film within the chamber and a consequent agitation of the processing solution.

A further object of this invention is to provide a combination controlled film takeup and processing cassette wherein the cassette includes a controlled takeup reel carried within a chamber substantially filled with a viscous processing solution and wherein the cassette includes means to accommodate viscous processing solution displaced from the chamber by film wound onto the reel within the chamber.

A more specific object of this invention is to provide a combination controlled film takeup and processing cassette wherein the cassette includes a controlled takeup reel carried within a first chamber substantially filled with a processing solution, and wherein the cassette includes a second chamber to accommodate processing solution displaced from the first chamber by film wound onto the reel.

Another object of this invention is to provide a combination controlled film takeup and processing cassette wherein the cassette includes a controlled takeup reel carried within a chamber substantially filled with a viscous processing solution, the enclosing wall of the chamber being flexible so as to permit increased capacity of the chamber as required by the viscous solution displaced when film is wound onto the reel.

A further object of this invention is to provide an improved method of handling and processing film within a camera.

With the foregoing and other objects in view, the invention resides in the following specification and appended claims, certain embodiment and details of construction of which are illustrated in the accompanying drawings in which:

Figure 1:
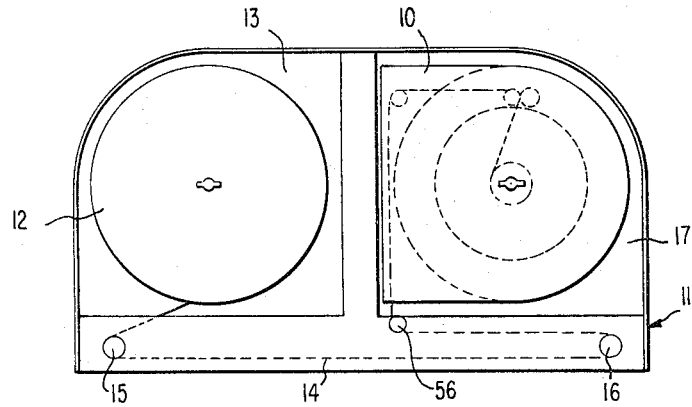
FIGURE 1 illustrates a camera and film cartridge into which the cassette of this invention has been inserted.

Referring more particularly to the form of the invention illustrated in FIGURES 1-4, the cassette 10 forming the invention is illustrated as having been inserted in a film cartridge 11 for a motion picture camera. The cartridge 11 includes a film supply roll 12 suitably mounted within a chamber 13. Film 14 from said supply roll 12 is illustrated in dotted lines as being directed about guide rolls 15 and 16 into the chamber 17 of cartridge 11 to the cassette 10. The actual film cartridge forms no part of this invention and is to be considered as merely illustrative of the type of application to which the cassette may be applied.

Figure 2:
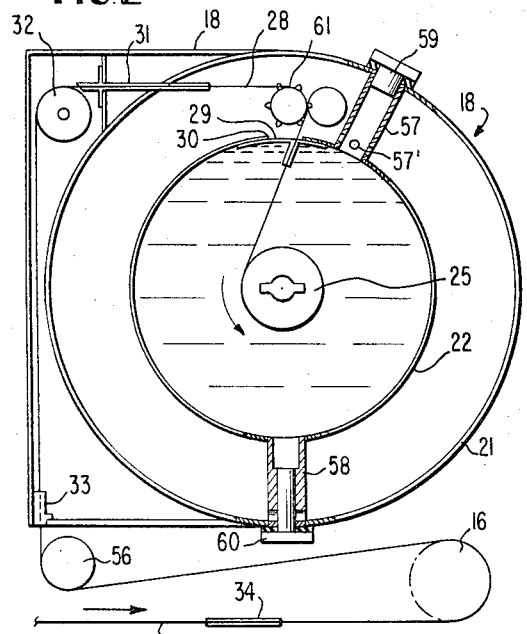
FIGURE 2 is an enlarged section view in side elevation of the cassette of this invention.
Figure 3:
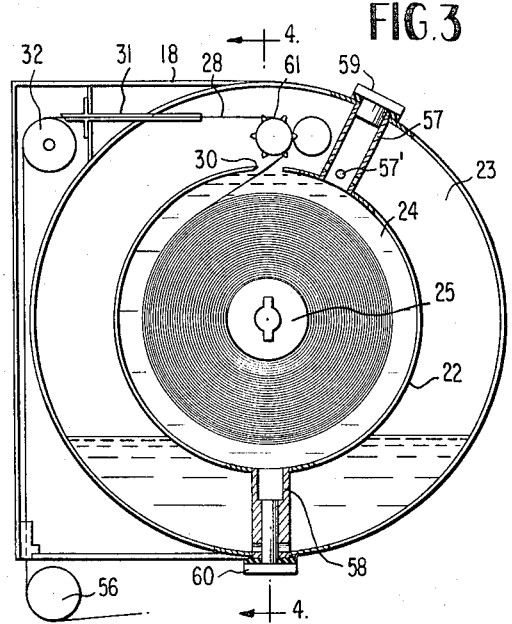
FIGURE 3 is a view similar to FIGURE 2, but illustrating film wound onto the takeup reel within the cassette.
Figure 4:
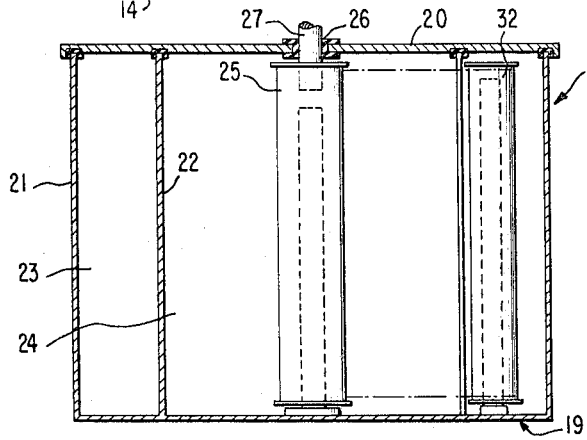
FIGURE 4 is a section view along the line 4—4 of FIGURE 3.

Referring specifically to FIGURES 2, 3 and 4 it will be noted that the cassette 10 includes an outer casing 18 including side walls 19 and 20, the latter being removably secured to the casing 18 for purposes to be described. The casing 18 is further provided with two concentric circumferential walls 21 and 22 forming chambers 23 and 24. Within the chamber 24 is mounted a reel 25, the reel being journalled at 26 in the removable cover 20. The drive shaft 27 for the reel 25 is shown in broken away form but is illustrated to indicate that any type of drive attachment may be suitable to turn the reel when the unit is mounted within a particular type of camera. The drive means for the reel is preferably one affording an intermittent film advance within the chamber 24 and a suitable arrangement to accomplish the purpose will be hereinafter described in connection with FIGURES 11, 12 and 13.

Affixed to the reel 25 is a film leader 28 which extends through a seal member 29 adjacent an opening 30 in the wall 22. The leader further extends through a guide member 31 extending through the wall 21 about the guide roll 32 and to the exterior of the cassette 10 through a slot 33. Attachment may be made by a suitable splicing means at the point 34 to the film 14 after passing about guide rolls 56 and 16.

The interior chamber 24 is substantially completely filled with a monobath processing solution for film. Solutions of this type are well known in the art and generally comprise compatible photographic developer and fixer agents. While various formulations may be suitable for use with this invention, it is imperative that the processing solution be effective enough to be commensurate with the speed of the film being wound into the cassette. The effectiveness of the solution and the design of the equipment are to a large extent tied into the viscosity of the solution as will be later described. In storage the various openings about and within the cassette are covered with removable seals such as seal 29 to prevent leakage. These seals, which may be frangible, are easily removed at time of use. The cassette 10 is further provided with passages 57 and 58 normally closed by plugs 59 and 60, whereby fluid may be added to or removed from chambers 23 and 24.

In the operation of the form of the invention in FIGURES 1–4, the cassette is fitted into a cartridge 11 for introduction into a motion picture camera, for example of the high speed aerial type, and the leader 28 is attached to the film 14 from a supply roll 12. Upon operation of the camera the film is wound into the interior chamber 24 by a film advancing sprocket wheel 61 and reel 25, and, as the diameter of the wound film increases, the monobath processing solution is displaced outwardly through the opening 30 from which the seal 29 has been removed and through ports 57' of passage 57 into the secondary chamber 23 which in this form of the invention is radially disposed with regard to the chamber 24. By having the inner chamber completely filled with the processing solution, it should be quite obvious to one skilled in the art that the film will be developed as it is being wound upon the reel 25 so that upon demand, immediate use may be made of the processed film. All that need be done is that the cassette be inserted into a suitable projector. By having the cover 20 removable, the monobath solution can be initially installed in the chamber 24 and the temporary seals can be placed over the opening 30 and other points so that the cassette may sit in storage awaiting actual use. Also in order to replace the solution or to reinsert the same into the chamber 24, access is readily had by means of the passages 57 and 58.

Figure 5:
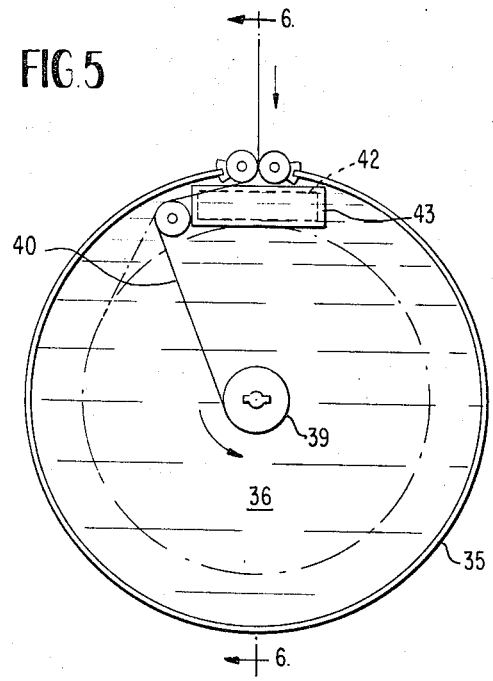
FIGURE 5 is a view in front elevation illustrating a modified form of the invention.
Figure 6:
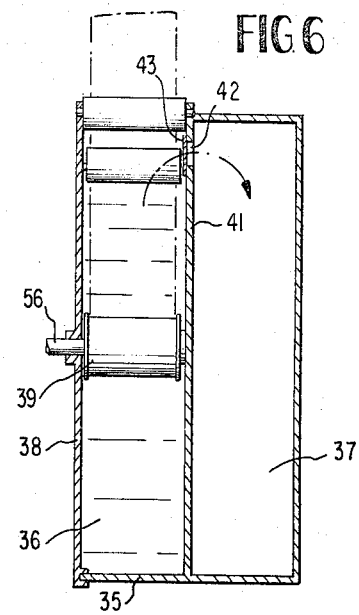
FIGURE 6 is a section view in side elevation of the form of the invention illustrated in FIGURE 5.
Figure 7:
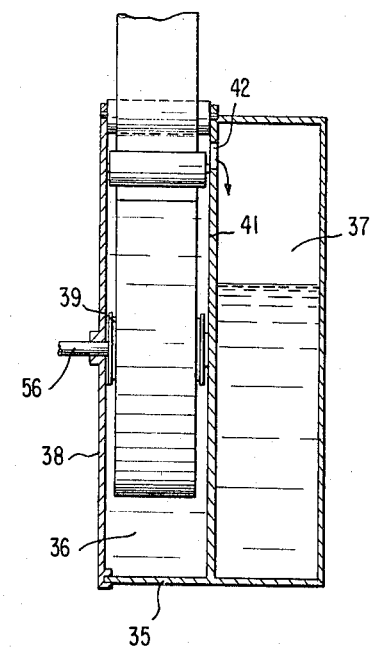
FIGURE 7 is a view similar to FIGURE 6 illustrating the cassette of FIGURE 5 with a considerable amount of film wound therein.

In the form of the invention illustrated in FIGURES 5, 6 and 7 a cassette 35 is illustrated including primary chamber 36 and an axially displaced secondary chamber 37. The chamber 36 is covered on one side by a removable cover member 38 in a manner similar to that of cover 20 of the preferred form of the invention. Within chamber 36 and carried by the cover member 38 is a takeup reel 39 to which a leader 40 is secured for attachment to a strip of film. The reel 39 is provided with a suitable external drive connection 56.

Initially, as is illustrated in FIGURE 6, a dividing wall 41 between the chambers 36 and 37 which is provided with an orifice 42 has covering such orifice a temporary seal member 43 whereby the chamber 36 may be a depository for a monobath film processing solution. As in the preferred form of the invention upon operation within a motion picture camera, with the reel 39 taking up film, the increasing diameter of the rolled film will displace the processing solution from chamber 36 through the orifice 42 into the secondary chamber 37. When the film has been completely wound into the chamber 36, the cassette may be removed from the camera and directly installed into a suitable projector for direct showing without further processing being necessary. It is thus seen, therefore, that this form of the invention also provides for instantaneous development of film as it is being wound onto a takeup reel within a camera immediately following exposure of the film to a particular target area.

It should be quite obvious to one skilled in the art that by removing the cover 38 the film may be removed from this particular cassette and the process solution may be emptied therefrom and reinserted into the chamber 36 or in the alternative a fresh solution may be installed in the chamber 36 and the cassette 35 re-setup for storage prior to again being used at a future time.

Figure 8:
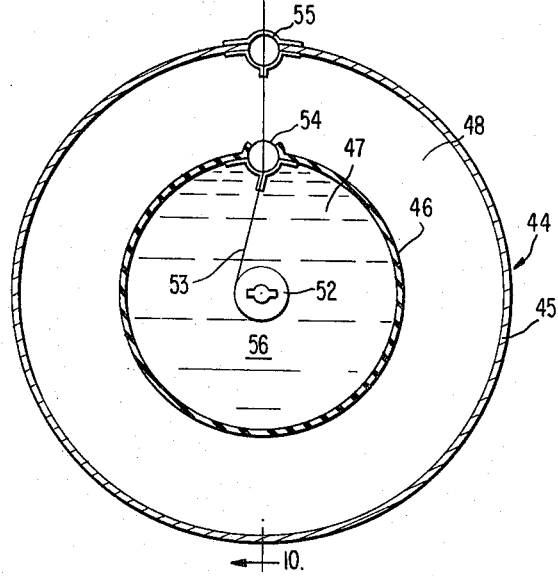
FIGURE 8 is a view in side elevation of another form of the invention.
Figure 10:
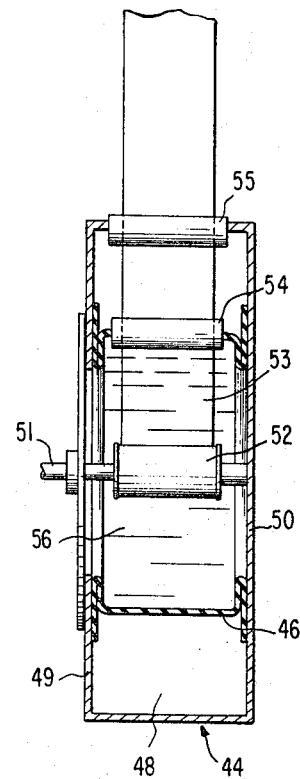
FIGURE 10 is a section view in side elevation taken along the line 10—10 of FIGURE 8.
Figure 9:
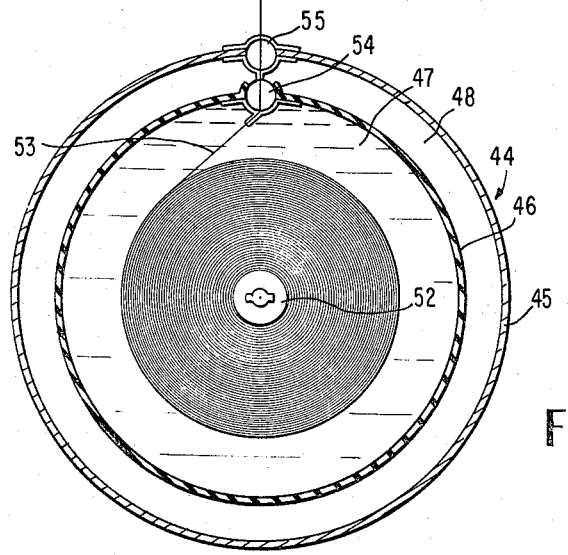
FIGURE 9 is a view of the form of the invention of FIGURE 8 during operation.

Now referring to the form of the invention illustrated in FIGURES 8, 9 and 10, a cassette 44 is illustrated as having an exterior wall of generally circular shape 45 and an interior flexible wall 46 of suitable material. The interior wall 46 divides the interior of cassette 44 into two concentric chambers 47 and 48. The flexible wall 46 is secured by any suitable adhesive means to the side walls 49 and 50 of the cassette 44. Extending into the chamber 47 is a drive shaft 51 suitable for external drive connection. Mounted on the shaft 51 is a takeup reel 52 to which a leader 53 is secured. The leader 53 extends through suitable, flexible seals 54 and 55 to the exterior of cassette 44 for attachment to a film strip as in the previously described forms of the invention.

In operation of the form of the invention illustrated in FIGURES 8, 9 and 10, when rotation is imparted to the shaft 51, the takeup reel 52 will pull the film into the interior of the chamber 47 displacing the processing fluid 56 contained therein so that the flexible wall 46 will expand equally outwardly radially toward the interior of wall 44 in order to fully accommodate the film and the liquid therein. As in the previously described forms of the invention, upon being wound into the cassette 44 the monobath processing solution in the chamber 47 quickly processes the film for immediate display in suitable projection equipment. Not shown in FIGURES 8, 9 and 10 which are intended to be illustrative only of the chamber configuration or arrangement, is a film advancing sprocket to advance the film into the cassette from the exterior as in the other forms of the invention.

Figure 11:
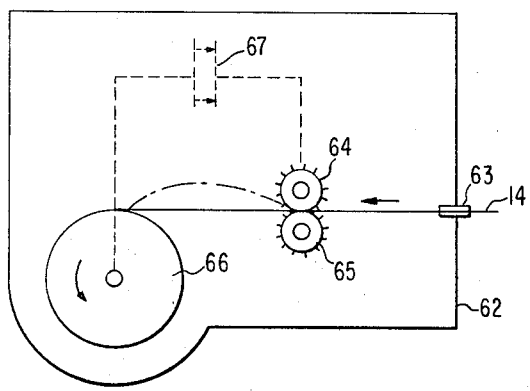
FIGURE 11 is a diagrammatic view of the action within the processing chamber of the cassette illustrating a looping of the film in broken lines due to intermittent advance of the film.

With reference to FIGURE 11, a diagrammatic illustration is given showing the preferred manner of film advance within the combination takeup and processing cassette for each form of the invention. The chamber 62 receives the film 14 through a slotted seal 63 from which it is threaded onto suitable drive sprockets 64 and 65. From the drive sprockets the film is wound onto takeup reel 66. Intermediate the sprockets and the reel, it is desirable to introduce a periodically recurring loop in the film 14 as illustrated by broken lines. By providing such an action the processing liquid within the chamber is thoroughly agitated to treat the exposed film surface with a continuously circulating portion of the liquid. This looping action may be provided by periodically stopping or slowing the reel 66 relative to the advancing sprockets. This may be conveniently done by driving both the reel and sprockets from a suitable drive in the camera (not shown), and providing a clutch 67 between such drive and the reel 66. With such an arrangement the film is advanced at a constant rate by the sprockets so that a loop begins to form each time the reel 66 is stopped. Then when the reel 66 is positively clutched, the loop is removed. This loop removal is facilitated by correlating the diameter of reel 66 to film speed in such a manner as to avoid a bunching or jamming of the film. The diameter of the takeup reel 66 is preferably on the order of ten to fifteen percent greater than the diameter of the drive sprockets 64 and 65 to properly accomplish the desired result.

As exposed film 14 is wound on the takeup reel 66, such film must carry and hold a sufficient quantity of processing solution to complete the development and fixing. The amount of solution trapped by the film convolution is determined by solution viscosity. For example, the solution must have a viscosity greater than water to prevent the expulsion of substantially all solution from between adjacent convolutions and thereby achieve retention of a continuous layer of developer solution. In doing so the wound film forms what may be termed a soft pack. The pertinence of the relationship of the solution viscosity to drive operation will be hereinafter described in connection with the actual drive arrangement for the cassette.

Figure 13:
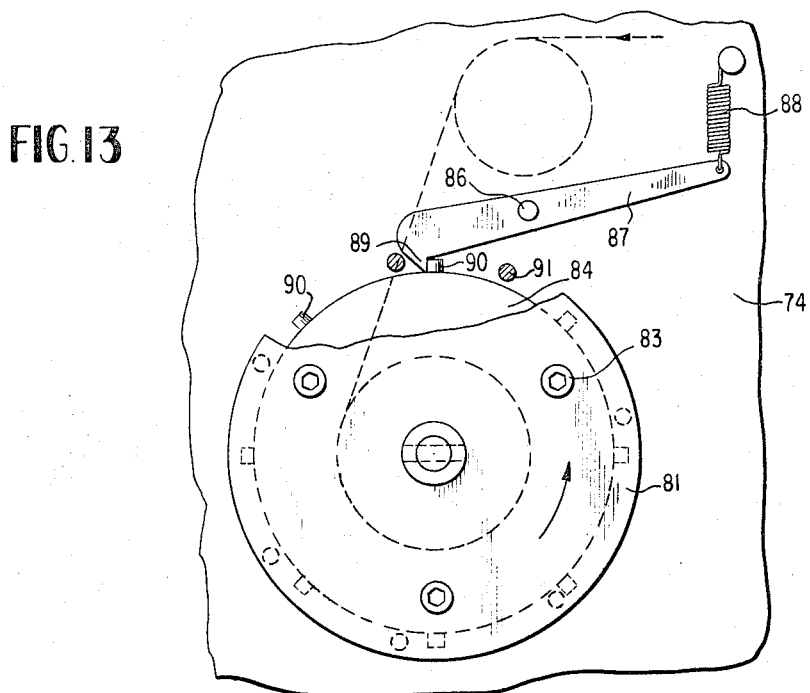
FIGURE 13 is a fragmentary, plan view of the controlled clutch arrangement for the advancing means of FIGURE 12.
Figure 12:
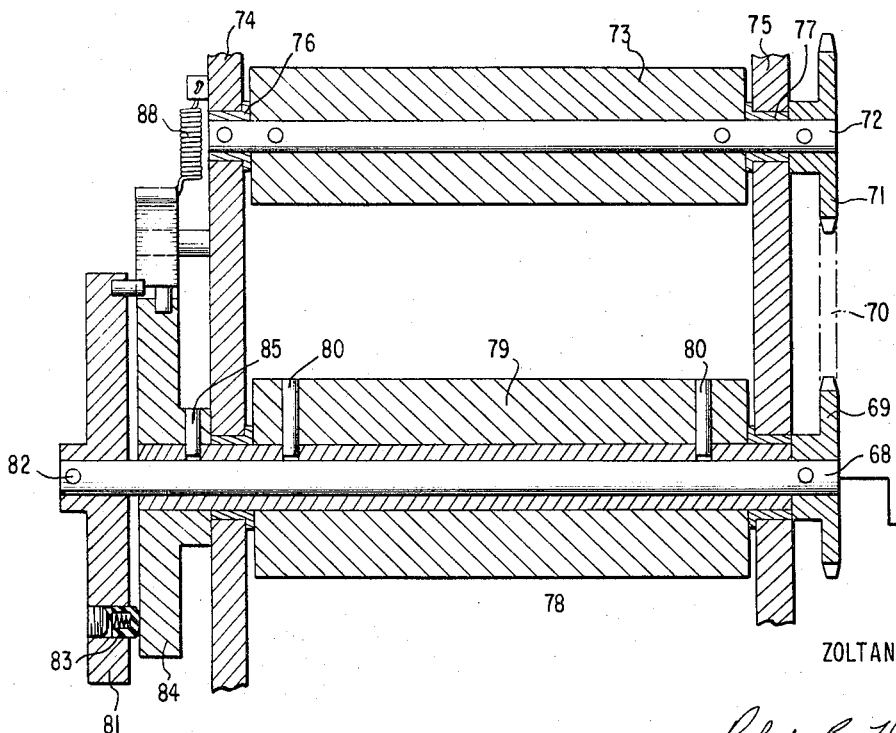
FIGURE 12 is a fragmentary, sectioned view in side elevation illustrating the preferred form of the invention in which an intermittent advance means is provided for the film in the processing chamber of the cassette.

Now referring to FIGURES 12 and 13 it will be noted that a suitable intermittent drive, adaptable to each form of the invention, is provided. A drive shaft 68 is driven at either end by means (not shown) within a camera. At one end of the shaft 68 is a sprocket 69 engaged with an endless chain 70 shown in broken lines. The chain 70 is connected with a sprocket 71 keyed to a drive shaft 72 which carries the positive film advance sprocket 73. The shaft 72 is mounted between walls 74 and 75 of the cassette and is provided with suitable combination sealing and bearing units 76 and 77 of Teflon or other suitable material.

Concentrically mounted about drive shaft 68 is a sleeve 78. This sleeve is keyed to a takeup reel 79 by means of pins 80. The sleeve 79, however, is rotatable relative to the shaft 68. On the left end of shaft 68 as viewed in FIGURE 12, there is provided a clutch drive wheel 81 which is keyed to the shaft 68 by pin 82. The wheel 81 is provided with a plurality of spring loaded clutching fingers 83 which engage the opposed surface of a driven wheel 84. The wheel 84 is keyed by a pin 85 to the sleeve 78. Thus when shaft 68 is driven, the sleeve 78 will be driven through clutch fingers 83 which may be formed of any suitable wear resistant material. The rate of rotation will be that of the shaft 68 minus an amount due to clutch slippage as a result of solution viscosity. In order to introduce an intermittent rotation into reel 79 the clutch arrangement is provided with an intermittently acting positive stop for the wheel 84. With particular reference to FIGURE 13 it will be noted that the wall 74 has pivotally mounted thereon at pivot 86 a pawl 87. A spring 88 secured at one end to the wall 74 and at the other end to pawl 87 biases the pawl in a counterclockwise direction. The other end of the pawl is provided with a hook 89 which is adapted to engage stop pins 90 spaced about the periphery of wheel 84. Upon such engagement by the pawl, the wheel 84 and the sleeve 78 are prevented from rotating. Affixed to the inner surface of wheel 81 are a plurality of equally spaced pins 91. The pins 91 upon rotation of wheel 81 engage the pawl 87 raising same sufficiently to release the hook 89 from an engaged stop pin 90. Upon such release the clutch fingers 83 will be able to drive wheel 84 and hence reel 79. While the wheel 84 is held against rotation, the clutch fingers merely slide over the surface of wheel 84 as the wheel 81 continues to rotate. It will be noted that the diameter of reel 79 is greater than that of the advancing sprocket 73. As before mentioned, the differences in diameter is designed in such a manner that each time the wheel 84 is stopped, a loop is formed in the film and each time the wheel resumes rotation the loop is substantially removed. This action results in a rather loose winding of the film onto reel 79, particularly in the outer convolutions and achieves a squeezing action of the viscous processing liquid from between such convolutions each time the wheel 84 resumes rotation at a faster takeup rate than the rate at which film is being drawn into the chamber by sprocket 73. In thus forming a relatively loose winding on the reel 79, the desired layer of solution is achieved between convolutions of the film. Also the viscosity of the solution itself helps prevent any tendency of the clutch drive to cause too great a squeezing action on the film during loop removal. By retaining the appropriate layer between convolutions of the film an additional drag is created in carrying the film and maintaining process capability as well. As the wound roll diameter increases the slippage of the clutch pins 83 becomes more evident therefore due to the combined drag forces of the solution and the rolled film. The actual viscosity of the solution for the unit may be on the order of 50 to 500 centipoises depending on the character of the film being used. In other words, the thicker the emulsion layer is on the film, the greater the amount of solution is for processing.

Thus in each form of the invention there is provided a cassette with an interior chamber containing a takeup reel, with the reel being submerged in a monobath processing solution and the chamber in which said reel is located being substantially filled with such solution. Also in each form of the invention, provision is made for the displacement of the processing solution as the film is wound onto the takeup reel making certain that the film coming into the chamber is completely contacted at all times by the processing solution before being wound onto the reel. In this manner the film upon being wound onto the reel is almost immediately ready for installation in a projection equipment whereby quick review may be made of the exposed film from the camera. Furthermore, each form of the invention is preferably provided with an intermittent film advance as illustrated in FIGURES 11, 12 and 13, to thereby improve the action of the processing solution on the exposed film.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A combination film takeup and processing cassette for handling strip film in a motion picture camera comprising a casing, said casing including a chamber for receiving exposed film through an access opening in the casing, a winding reel positioned within said chamber, means to mount said reel in the chamber so as to be accessible to a drive force from the exterior of the casing, said chamber about said reel being substantially filled with a processing solution for said film, and an overflow reservoir within and forming a part of the cassette to accommodate displaced solution from the chamber as film is wound onto the reel, said reservoir and said chamber having a liquid-communicating connection between their respective upper parts.

2. A combination film takeup and processing cassette for motion picture cameras comprising a casing suitable for insertion into a camera, said casing having a peripheral access opening to receive strip film, first and second chambers within said casing, said first chamber having an access opening to receive film directed into the chamber through the access opening of the casing, said first chamber being substantially filled with a film processing solution, a winding reel positioned within said first chamber, combination support and drive connection means for said reel to provide drive access from the exterior of the casing, removable cover means for the casing to provide access to said chambers and said reel, and a liquid-exhaust connection from an upper part of said first chamber to an upper part of said second chamber, whereby solution displaced by film wound onto the reel is directed into the second chamber.

3. The invention according to claim 2 wherein the first chamber is provided with at least one enclosing wall and said second chamber is positioned adjacent said wall.

4. The invention according to claim 3 wherein said wall is common to both said first and second chambers.

5. A combination film takeup and processing cassette comprising a casing suitable for insertion into a camera, a first chamber within said casing, a winding reel positioned within said first chamber, combination support and drive connection means for said reel to provide drive access from the exterior of the casing, said first chamber being substantially filled with a film processing solution, and a second chamber within the casing adjacent said first chamber, and a liquid-exhaust connection from an upper part of said first chamber to an upper part of said second chamber, whereby processing solution displaced by film wound onto the reel is directed into the second chamber.

6. The invention according to claim 5 wherein the first chamber is provided with at least one enclosing wall and said second chamber is positioned adjacent said wall.

7. The invention according to claim 6 wherein said wall is common to both said first and second chambers.

8. A combination film takeup and processing cassette comprising a casing suitable for insertion into a camera, film advancing means within said casing, a chamber within said casing, spaced from said advancing means, a takeup reel positioned within said chamber, drive means for simultaneously driving said takeup reel and said advancing means, means to interrupt the drive to said takeup reel at periodic intervals, said chamber being substantially filled with a film processing solution, and means within the casng to accommodate the solution displaced by film wound onto the reel.

9. The invention according to claim 8 wherein the drive means include a direct, continuous driving connection for the film advancing means and an intermittently operating clutch drive for the takeup reel.

10. The invention according to claim 8 wherein the film processing solution has a viscosity in the range of 50 to 500 centipoises.

11. A combination film takeup and processing cassette comprising a casing suitable for insertion into a camera, a first chamber within said casing, a winding reel positioned within said first chamber, combination support and drive connection means for said reel to provide drive access from the exterior of the casing, said first chamber being substantially filled with a film processing solution, and a second chamber within the casing adjacent said first chamber and being in fluid communication with said first chamber, whereby processing solution displaced by film wound onto the reel is directed into the second chamber, said second chamber being concentrically arranged and coplanar with said first chamber.

12. A combination film takeup and processing cassette for motion picture cameras comprising a casing suitable for insertion into a camera, said casing having a peripheral access opening to receive strip film, first and second chambers within said casing, said first chamber having an access opening to receive film directed into the chamber through the access opening of the casing, said first chamber being substantially filled with a film processing solution, a winding reel positioned within said first chamber, combination support and drive connection means for said reel to provide drive access from the exterior of the casing, and removable cover means for the casing to provide access to said chambers and said reel, said first and second chambers being in fluid communication with each other, whereby solution displaced by film wound onto the reel is directed into the second chamber, said second chamber being concentrically arranged and coplanar with said first chamber.

13. A combination film takeup and processing cassette for handling strip film in a motion picture camera comprising a casing, said casing including a chamber for receiving exposed film through an access opening in the casing, a winding reel positioned within said chamber, means to mount said reel in the chamber so as to be accessible to a drive force from the exterior of the casing, said chamber about said reel being substantially filled with a processing solution for said film, and means within and forming a part of the cassette to accommodate displaced solution from the chamber as film is wound onto the reel, a portion of said chamber being formed by a peripheral flexible wall permitting expansion of the chamber under the force of the fluid solution displaced by the film wound on the reel to a capacity sufficient to accommodate both the film and the solution.

14. A combination film takeup and processing cassette comprising a casing suitable for insertion into a camera, a first chamber within said casing, a winding reel positioned within said first chamber, combination support and drive connection means for said reel to provide drive access from the exterior of the casing, said first chamber being substantially filled with a film processing solution, and a second chamber within the casing adjacent said first chamber and being in fluid communication with said first chamber, whereby processing solution displaced by film wound onto the reel is directed into the second chamber, said casing and chambers being provided with generally aligned film access openings, and wherein said reel is provided with a leader extending through said openings for attachment to film to be processed.

15. A combination film takeup and processing cassette comprising a casing suitable for insertion into a camera, a chamber within said casing, a winding reel positioned within said chamber, combination support and drive connection means for said reel to provide drive access from the exterior of the casing, said chamber being substantially filled with a film processing solution, and means within the casing to accommodate the solution displaced by film wound onto the reel, said casing and chamber being provided with generally aligned film access openings, and wherein said reel is provided with a leader extending through said openings for attachment to film to be processed.

16. A cassette according to claim 15, and intermittent drive means spaced from said reel for feeding film onto said reel, whereby film between said intermittent drive means and said winding reel is displaced in such manner as to agitate the solution.

References Cited

UNITED STATES PATENTS

| | | | |
|---|---|---|---|
| 899,495 | 9/1908 | Abbott | 95—90.5 |
| 1,274,651 | 8/1918 | Windrim et al. | 95—90.5 |
| 1,561,699 | 11/1925 | Ybarrondo | 95—90.5 |
| 2,769,381 | 11/1956 | Lesjak | 95—90.5 |

NORTON ANSHER, *Primary Examiner.*

JOHN M. HORAN, *Examiner.*

FRED L. BRAUN, *Assistant Examiner.*